United States Patent [19]

Kunstadt

[11] 4,295,205

[45] Oct. 13, 1981

[54] SOLID STATE MASS MEMORY SYSTEM COMPATIBLE WITH ROTATING DISC MEMORY EQUIPMENT

[76] Inventor: George H. Kunstadt, 4450 La Barca, Tarzana, Calif. 91356

[21] Appl. No.: 951,711

[22] Filed: Oct. 16, 1978

[51] Int. Cl.³ .......................... G06F 3/00; G06G 7/48
[52] U.S. Cl. ..................................... 364/900; 365/230
[58] Field of Search ... 364/200 MS File, 900 MS File; 365/230; 360/39, 51

[56] References Cited

U.S. PATENT DOCUMENTS

| | | | |
|---|---|---|---|
| 3,290,654 | 12/1966 | Rettig et al. | 364/200 |
| 3,938,101 | 2/1976 | Lewis et al. | 364/200 |
| 4,053,944 | 10/1977 | Dixon | 364/200 |
| 4,068,304 | 1/1978 | Beausoleil et al. | 364/200 |
| 4,084,229 | 4/1978 | Taylor et al. | 364/200 |
| 4,145,745 | 3/1979 | De Bijl et al. | 364/200 |

OTHER PUBLICATIONS

Bantz et al., "Enhanced I/O Subsystem Using a Device Engine" in *IBM Tech. Discl. Bulletin*, vol. 19, No. 10, Mar. 1977, pp. 4043-4044.

*Primary Examiner*—Gareth D. Shaw
*Assistant Examiner*—Eddie P. Chan
*Attorney, Agent, or Firm*—Herzig & Walsh, Inc.

[57] ABSTRACT

A solid state mass memory system, utilizing memory units other than rotating disc memories, compatible with existing external rotating disc memory equipment designed to operate in conjunction with rotating disc memory units only, includes means for simulating a rotating disc memory with respect to a disc memory controller. The system includes means for generating synthetic origin, sector and bit clocks for input to the computer disc controller, the pulses being several orders of magnitude faster than those obtainable with rotating disc memories. Upon detection by the controller of the proper sector, means are provided for halting the synthetic sector pulses while a normal read/write operation takes place. At the end, a further sector clock is generated, and the system may proceed to a further read/write operation or proceed in a standby mode in the absence of a read/write signal. In this manner, advanced, solid state external mass memory systems may be employed in conjunction with a memory controller designed to operate with only rotating disc memories, without requiring replacement of said disc memory controller with expense memory control equipment designed to operate with solid state external mass memory systems.

6 Claims, 1 Drawing Figure

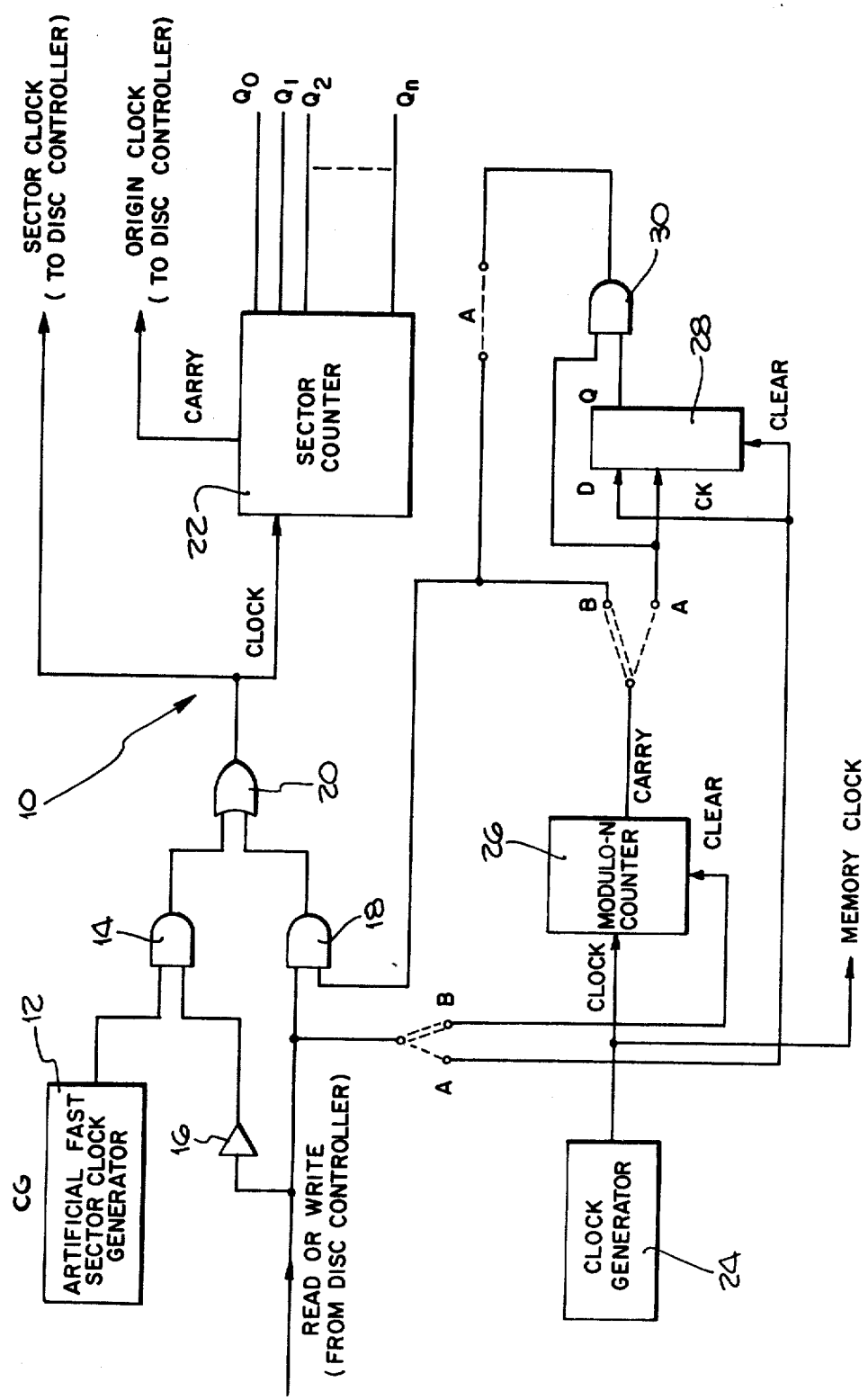

SOLID STATE MASS MEMORY SYSTEM COMPATIBLE WITH ROTATING DISC MEMORY EQUIPMENT

BACKGROUND OF THE INVENTION

1. Field of the Invention

The field of the invention is computer peripheral equipment and, in particular, means for rendering existing disc memory equipment compatible with external solid state memory devices.

Larger computer systems frequently employ an external mass memory to augment their internal memory systems. Historically, such a memory has taken the form most frequently of a rotating disc file. The latter employ rotating discs and recording heads which magnetically record information in magnetic coatings on the rotating discs. The stored information occupies a very small magnetized area on the disc and has the advantage of constituting an extremely inexpensive system. Such disc file external memories have the important drawback of being mechanical and thus inherently less reliable than solid state devices and further suffer from limited speed of operation due to the mechanical rotation of the mechanical discs.

For every memory system, regardless of type, the computer must know where each specific bit of information is stored. In a disc memory system, the location of the information stored in the memory is identified by track address (usually carried on a number of parallel wires with signals corresponding to binary track address) and sector address. The latter is a small segment of track (i.e., 360°) which may be divided into numerous sectors usually ranging between 8 and 256. A given sector is associated with a particular number starting from an arbitrary origin fixed with respect to the disc rotation. In a track divided into eight sectors of 45° each, sector No. 1 would be from 0° to 45°, sector No. 2 from 45° to 90°, and so on.

The exact bit is identified through its sequential position with respect to the beginning of the sector in which it is located. Thus, track information is issued instantly in parallel, and sector and bit information depends on the time of occurrence with respect to the origin pulse and relative to the beginning of the sector.

In conjunction with external memory systems utilizing the disc arrangement described hereinabove, interface elements called "disc controllers" are employed to afford access to a disc by the computer. Normally, a disc controller receives track and sector address information in parallel from the computer, and observes timing signals generated by the disc designated origin clock, sector clock, and bit clock, in determining when the disc is ready. At that point, the controller turns to the computer and requests write data from the computer memory. In the inverse operation, i.e., when the computer requests certain read data, identified by track, sector, and word address, the controller waits for the proper time when such information is available from the disc, collects it, and transmits it to the computer memory.

Recently, advances in integrated circuit solid state electronics have rendered it economically feasible to produce solid state memories in commercial quantities. In these memories, each bit is stored in an individual electronic circuit. Two of the most successful types of solid state memories are a random access memory comprising numerous (e.g., on the order of thousands) individual small electronic circuits and a block-oriented random access memory comprising a multiplicity of individual "bucket brigade" delay lines utilizing charge coupled devices. Because of their increasing economic and commercial feasibility, there has been a trend toward the use of such solid state memory devices as external mass memories associated with computers. This, however, has had the disadvantage of requiring the development of expensive interface circuitry and programming permitting the computer to "understand" how to use the new types of mass memories.

Thereore, there has been a felt but unfulfilled need for a system permitting solid state memory devices to be employed as mass external memories for computers and peripheral apparatus arranged to utilize existing external disc memories, without requiring installation of extensive new interface circuitry and programming.

SUMMARY OF THE INVENTION

A mass memory system compatible with disc memory equipment employing a disc memory controller comprises means for simulating origin and sector signals which are transmitted from a disc memory system, for locating a selected memory module and for transmitting such signals to the disc controller. The system further comprises means for selecting a memory module for a read or write operation, said memory selecting means being responsive to the means for pulse generation to select a memory module upon termination of the simulated pulses.

BRIEF DESCRIPTION OF THE DRAWING

The drawing comprises a simplified block diagram depicting a system in accordance with the invention.

DETAILED DESCRIPTION OF A PREFERRED EMBODIMENT

A memory system 10 in accordance with the invention includes an artificial fast sector clock generator 12. The output of the artificial sector clock generator 12 is connected to an input terminal of an AND gate 14. Also connected to the input of the AND gate 14 is the output of an inverter 16, the input of which is connected to a read/write terminal of a disc controller (not shown). The latter is also connected to the input of an AND gate 18. The outputs of the gates 14, 18 are connected to the input of OR gate 20.

The OR gate 20 is connected to the input of a sector counter 22. The latter includes output lines $Q_0$ through $Q_n$ corresponding to the sectors to be counted, the output lines $Q_0$ through $Q_n$ constituting a register for memory register selection. In a conventional external memory system incorporating rotating discs, the disc controller will continuously count sector pulses after the origin, and the state of that counter is compared with the sector address requested by the computer. When the counter reaches the proper number corresponding to the address requested by the computer, the controller issues a write or read command to the memory. In accordance with the invention, wherein an artificial disc memory system is simulated, the same procedure occurs with respect to the synthetic sector clock generator signal. When either a read or a write command is received in the memory, the synthetic sector pulses are disabled. The read/write command is inverted at inverter 16, gate 14 goes into the "off" condition and gate 18 into the "on" condition. This eliminates the artificial sector generating clock signals to the counter 22, and the latter stops, with its output lines directly causing memory register selection.

The elements and operation of the invention described hereinabove apply equally to the two most successful solid state memory systems in current use, namely, the systems constituting recirculating delay lines (such as "bubble" memories and dynamic RAMs) and non-circulating memories (such as core memories and static RAMs). The remainder of the elements and operation of systems in accordance with the invention differ as between the two types of memory systems. In the description that follows, it will be seen that there are substantial common elements between the circuits which correspond to the two types of memory systems. The differing elements as between the two circuits will be designated as follows. Connections used only in the system adapted for use with the dynamic memory will be designated by "A", and the elements found only in the invention as applied to static memory systems will be designated by "B", in the circuit diagrams. The invention as applied to the dynamic memory system and mode will be considered first.

A free running clock generator 24 has its output connected to a modulo-N counter 26, which is set to produce a "carry" when the count reaches the desired number of bits per sector. Absent a write/read command, this procedure continues indefinitely in order to refresh the stored data. Thus, there is a memory clock output derived from the clock generator 24. The output of counter 26 is connected to an input of a flipflop 28.

The clear input of flip-flop 28 is connected to the controller to receive a read/write signal therefrom. The output of counter 28 is coupled to AND gate 30. Also coupled to the input of AND gate 30 is the output of counter 26. When a read/write command is received which indicates that the controller has found a sector match, the clear input to flip-flop 28 and the input to the D terminal, which is connected directly to receive read/write commands, are both raised. Upon the next occasion when the counter 26 issues a "carry", the Q output of flip-flop 28 goes "high" thus opening gate 30. The counter 26 continues to count, and the next "carry" goes through gates 18, 20, and 30, advancing sector counter 22 to the next sector.

The foregoing arrangement causes a new sector operation to start at the exact instant that the first data bit in the recirculating memory register is opposite the input/output port. This is necessary because generally, when the read/write command is received, the sector counter with its output lines $Q_0$ through $Q_n$ will be at any random position. In this condition, the counter 22 continues to count, the next "carry" corresponding to the starting position of the register. Because flip-flop 28 is in the low "Q" condition, this "carry" is not propagated through gate 30. The "carry" counter 22 signifies the end of the sector when the read/write operation commences. At this point, counter 26 is in the high "Q" condition; thus, the second "carry" will propagate through gates 18, 20, and 30, thus becoming the next sector clock. If the read/write command continues, the sector counter 22 continues to advance, with sector and origin clock pulses continuing to be generated, but at a substantially slower rate. The latter is determined by the time period it takes for actually reading or writing a complete sector. When the read/write command is terminated, the system reverts to the very fast artificial sector and origin clocks.

As stated hereinabove, the "B" connections constitute the configuration of the invention for the case of the static RAM situations and core memories. In the absence of read/write commands, counter 22 is held in the clear condition. When the read/write command is received, counter 22 commences counting. The first "carry" is used as the next sector clock. As long as the read/write command continues in existence, this pattern continues, with slow sector and origin clocks continuing to be generated. Removal of the read/write command resets counter 22, with a return to the artificial fast sector and origin clocks.

In particular applications of the invention, particular circuitry may be used. Specific circuitry in particular applications is primarily determined by the specific clocking requirements of a charge-coupled device memory system. In particular applications, it has been found to be appropriate to implement the artificial sector generator 12 and the clock generator 24 in the form of a single oscillator feeding various counters, with a fixed programmable memory chip. Other arrangements will be apparent to those skilled in the art.

Thus, a system has been provided for interface between a computer and an external solid state memory, which is completely compatible with computers having programs predicated upon standard mechanical rotating disc controller systems.

Though the invention has been described and depicted hereinabove, it is defined solely by the appended claims interpreted in light of the specification.

What is claimed is:

1. A mass memory system, having a plurality of memory modules, other than rotating disc memories, compatible with memory equipment employing a disc memory controller designed to operate only with rotating disc memories and in conjunction with a computer, said system comprising:

means connected to a disc memory controller for providing signals simulating origin and sector signals like those which are transmitted from a rotating disc memory system and for transmitting said signals to a disc memory controller; and memory module selecting means for selecting one of said memory module for a read or write operation, said memory module selecting means being connected to said means for providing signals simulating origin and sector signals like those which are transmitted from a rotating disc memory system and also being connected to said plurality of memory modules and being responsive to cessation of said simulated origin and sector signals to select one of said memory module, whereby said memory equipment designed to operate only with rotating disc memories is usable with solid state memories having a plurality of memory modules other than rotating disc memories.

2. The mass memory system as set forth in claim 1 wherein said mass memory system comprises a recirculating memory register having a starting position and further including means connected to said recirculating memory register, for starting a new sector count, at the starting position of the recirculating memory register.

3. The mass memory system as set forth in claim 1 wherein said origin and sector signals like those simulating origin and sector signals like those which are transmitted from a rotating disc memory system are more rapid than location origin and sector pulses in a rotating disc memory system.

4. The mass memory system as set forth in claim 1 wherein said means for providing signals which simulate origin and sector signals which are transmitted from a rotating disc memory system comprises pulse generating means and counter means connected to said pulse generating means, the pulse generating means generating simulated sector pulses and the counter means being adapted to generate a carry after receiving a selected numer of said pulses from said pulse generating means, thereby to simulate an origin pulse.

5. The mass memory system as set forth in claim 4 wherein said memory module selecting means comprises output lines connected to said plurality of memory modules containing a module to be selected.

6. The mass memory system as set forth in claim 2 wherein said means for starting a new sector, comprises clock generating means for generating clock pulses, and counter means other than said first mentioned counter means coupled to said clock generating means, the first mentioned counter means being set to produce a carry when the count of said first mentioned counter means reaches a selected number of bits per sector, the second mentioned counter means being connected to said first mentioned counter means and to said rotating disc memory controller so that upon receiving a read or write command from said rotating disc memory controller, the next carry of said second mentioned counter means advances said first mentioned counter means to the next succeeding sector.

* * * * *